(12) United States Patent
Kainuma

(10) Patent No.: US 9,506,503 B2
(45) Date of Patent: Nov. 29, 2016

(54) DRIVING DEVICE

(71) Applicant: KYOCERA Document Solutions Inc., Osaka-shi, Osaka (JP)

(72) Inventor: Takashi Kainuma, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 211 days.

(21) Appl. No.: 14/338,167

(22) Filed: Jul. 22, 2014

(65) Prior Publication Data

US 2015/0027841 A1 Jan. 29, 2015

(30) Foreign Application Priority Data

Jul. 26, 2013 (JP) .................................. 2013-156125

(51) Int. Cl.
*F16D 11/14* (2006.01)
*F16D 7/04* (2006.01)

(52) U.S. Cl.
CPC ............... *F16D 11/14* (2013.01); *F16D 7/044* (2013.01)

(58) Field of Classification Search
None
See application file for complete search history.

(56) References Cited

U.S. PATENT DOCUMENTS

| 1,988,206 | A | * | 1/1935 | Lansing | F02N 19/001 123/179.22 |
|---|---|---|---|---|---|
| 2,413,045 | A | * | 12/1946 | Hoekstra | F02N 5/02 123/179.22 |
| 4,558,770 | A | * | 12/1985 | Woodruff | F16D 41/00 192/48.6 |

FOREIGN PATENT DOCUMENTS

JP 2005107413 A 4/2005

* cited by examiner

*Primary Examiner* — Colby M Hansen
(74) *Attorney, Agent, or Firm* — Alleman Hall McCoy Russell & Tuttle LLP

(57) ABSTRACT

A driving device includes shaft, support member, restraining member, and connection portion. Shaft has a screw portion formed on an outer peripheral surface thereof. Support member rotatably supports shaft. Restraining member restrains shaft so as not to be movable in an axial direction thereof. Connection portion is formed in one end portion of shaft, and has output-side joint member detachably connected thereto. Input-side joint member is engaged by thread with screw portion of shaft so as to be rotatably supported. By being driven to rotate by drive source, input-side joint member is movable between connection position where input-side joint member is connected to output-side joint member and withdrawal position where connection is cut off. Driving device includes compression spring. When input-side joint member is moved from withdrawal position to connection position by drive source, compression spring compressively deform, while being sandwiched by input-side joint member and output-side joint member.

6 Claims, 10 Drawing Sheets

THE OTHER SIDE (WITHDRAWAL POSITION SIDE) ←— AXIAL DIRECTION OF SHAFT 52 —→ ONE SIDE (CONNECTION POSITION SIDE)

THE OTHER SIDE ←— AXIAL DIRECTION OF SHAFT 52 —→ ONE SIDE
(WITHDRAWAL                                        (CONNECTION
POSITION SIDE)                                     POSITION SIDE)

DRIVING DEVICE

INCORPORATION BY REFERENCE

This application is based upon and claims the benefit of priority from the corresponding Japanese Patent Application No. 2013-156125 filed on Jul. 26, 2013, the entire contents of which are incorporated herein by reference.

BACKGROUND

The present disclosure relates to a driving device including a drive source, and an input-side joint member to be driven to rotate by the drive source, the driving device configured to drive a driven body to rotate by connecting the input-side joint member to an output-side joint member fixed to the driven body.

As a typical driving device of this type, for example, a driving device that drives a photosensitive drum of an image forming apparatus to rotate is known.

The above driving device includes an input-side joint member provided in the body of the image forming apparatus. The input-side joint member is externally fitted to a cylindrical portion formed in a center portion of a drum drive gear, in a slidable and integrally-rotatable manner. The drum drive gear is connected to a motor such that power transmission is allowed. Between the drum drive gear and the input-side joint member, a compression spring is interposed. The input-side joint member is urged toward the photosensitive drum side by the compression spring.

On the other hand, the photosensitive drum being a driven body has an output-side joint member connected thereto in an integrally-rotatable manner. The photosensitive drum is rotatably supported by a drum unit including a developing device, a transfer device, and the like. The drum unit is detachably mounted to a predetermined portion of the body of the image forming apparatus. When the drum unit is mounted to this predetermined portion, an engagement protrusion formed in the output-side joint member engages with a recess formed in the input-side joint member, whereby both joint members are connected to each other.

SUMMARY

A driving device according to one aspect of the present disclosure is a driving device including a drive source, and an input-side joint member to be driven to rotate by the drive source, the driving device configured to drive a driven body to rotate by connecting the input-side joint member to an output-side joint member attached to the driven body. The driving device includes a shaft, a support member, a restraining member, and a connection portion. The shaft has a screw portion formed on an outer peripheral surface thereof. The support member is configured to rotatably support the shaft. The restraining member is configured to restrain the shaft so as not to be movable in an axial direction thereof. The connection portion is formed in one end portion of the shaft, and has the output-side joint member detachably connected thereto. The input-side joint member is engaged by thread with the screw portion of the shaft so as to be rotatably supported. The input-side joint member is configured to, by being driven to rotate by the drive source, be movable between a connection position where the input-side joint member is connected to the output-side joint member, and a withdrawal position where the connection is cut off. The driving device further includes a compression spring. The compression spring is configured to, when the input-side joint member is moved from the withdrawal position to the connection position by the drive source, compressively deform, while being sandwiched by the input-side joint member and the output-side joint member.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described in detail with reference to the drawings. It should be noted that the present disclosure is not limited to the embodiments below.

Embodiment

Figure 1:
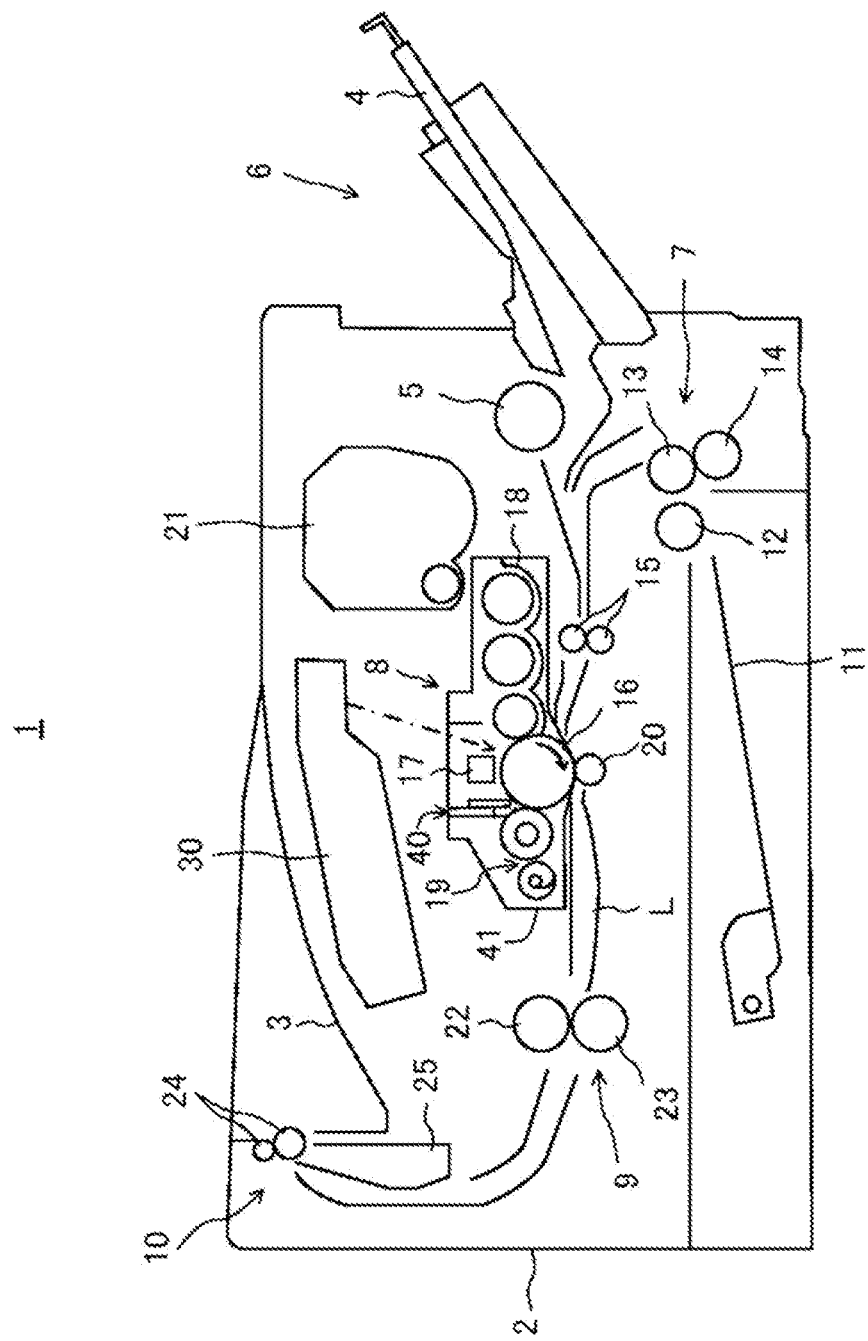
FIG. 1 is a schematic cross-sectional view showing an image forming apparatus including a driving device in an embodiment.

FIG. 1 is a cross-sectional view showing a schematic structure of a laser printer 1 according to the present embodiment.

As shown in FIG. 1, the laser printer 1 includes a printer body 2 of a box shape, a manual sheet feed portion 6, a cassette sheet feed portion 7, an image forming portion 8, a fixing portion 9, and a sheet discharge portion 10. The laser printer 1 is configured to, while conveying a paper sheet along a conveyance path L in the printer body 2, form an image on the paper sheet based on image data transmitted from a terminal or the like not shown.

The manual sheet feed portion 6 includes a manual feed tray 4 and a sheet feed roller 5 for manual feed. The manual feed tray 4 is provided at one side portion of the printer body 2 so as to be openable and closable. The sheet feed roller 5 is rotatably provided inside the printer body 2.

The cassette sheet feed portion 7 is provided in a bottom portion of the printer body 2. The cassette sheet feed portion 7 includes a sheet feed cassette 11, a pickup roller 12, a feed roller 13, and a retard roller 14. The sheet feed cassette 11 holds a plurality of stacked paper sheets. The pickup roller 12 takes out paper sheets, one by one, held in the sheet feed cassette 11. The feed roller 13 and the retard roller 14 separate, one by one, the paper sheet taken out by the pickup roller 12, to be sent to the conveyance path L.

The image forming portion 8 is provided above the cassette sheet feed portion 7 in the printer body 2. The image forming portion 8 is configured, as described later, to form an image on a paper sheet supplied from the manual sheet feed portion 6 or the cassette sheet feed portion 7.

Specifically, the image forming portion 8 includes a drum unit 40, a laser scanning unit 30, a transfer roller 20, and a toner hopper 21. The drum unit 40 includes a photosensitive drum 16 being an image carrier rotatably provided in the printer body 2. The laser scanning unit 30 is arranged above the drum unit 40. The transfer roller 20 is arranged immediately below the drum unit 40.

The drum unit 40 includes a charging device 17, a developing device 18, and a cleaning device 19, in addition to the photosensitive drum 16. These devices 16 to 19 forming the drum unit 40 are housed in a housing 41, and are assembled into one unit via the housing 41.

The drum unit 40 is mounted to a unit mounting portion in the laser printer 1, such that the drum unit 40 can be inserted into and detached from the unit mounting portion. The unit mounting portion is provided with a support base 26 (see FIG. 2) which supports the drum unit so as to be slidable in the front-rear direction of the printer 1. In the support base 26, a positioning plate 27 is provided in a standing manner and extending in the left-right direction (the direction perpendicular to the plane of paper in FIG. 2) of the printer. When the end face on the further side in the insert direction of the drum unit 40 comes into contact with the positioning plate 27, mounting of the drum unit 40 to the unit mounting portion is completed. To the positioning plate 27, a unit detection sensor 28 is attached. The detection sensor 28 detects that the end face on the further side in the insert direction of the drum unit 40 has come into contact with the positioning plate 27, and outputs a detection signal thereof to a controller 80 (see FIG. 6). When the drum unit 40 has come into contact with the positioning plate 27, a drive shaft 16a of the photosensitive drum 16 is connected to a drum driving device 50 (see FIG. 3 and FIG. 4) via an output-side joint member 61. The details of the drum driving device 50 will be described later.

To the upstream of the image forming portion 8, one pair of registration rollers 15 is provided. The pair of registration rollers 15 temporarily holds the paper sheet that has been sent, and then supplies the paper sheet to the image forming portion 8 at a predetermined timing.

The fixing portion 9 is arranged to a side relative to the image forming portion 8. The fixing portion 9 includes a fixing roller 22 and a pressure roller 23 which are pressed against each other to rotate. The fixing portion 9 is configured such that a toner image transferred to the paper sheet in the image forming portion 8 is fixed to the paper sheet.

The sheet discharge portion 10 is provided above the fixing portion 9. The sheet discharge portion 10 includes a sheet discharge tray 3, one pair of sheet discharge rollers 24, and a plurality of conveyance guide ribs 25. The sheet discharge rollers 24 are for conveying the paper sheet to the sheet discharge tray 3. The conveyance guide ribs 25 are for guiding the paper sheet to the pair of sheet discharge rollers 24. The sheet discharge tray 3 is formed in a recessed shape in an upper portion of the printer body 2.

When the laser printer 1 receives image data, in the image forming portion 8, the photosensitive drum 16 is driven to rotate and the charging device 17 charges the surface of the photosensitive drum 16.

Then, based on the image data, laser light is emitted from the laser scanning unit 30 to the photosensitive drum 16. On the surface of the photosensitive drum 16, an electrostatic latent image is formed by laser light being emitted. The electrostatic latent image formed on the photosensitive drum 16 is developed by the developing device 18, to become a visible image as a toner image.

Then, the paper sheet is pressed against the surface of the photosensitive drum 16 by the transfer roller 20. As a result, a toner image on the photosensitive drum 16 is transferred onto the paper sheet. The paper sheet on which the toner image has been transferred is heated and pressurized by the fixing roller 22 and the pressure roller 23 in the fixing portion 9. As a result, the toner image is fixed to the paper sheet.

Figure 2:
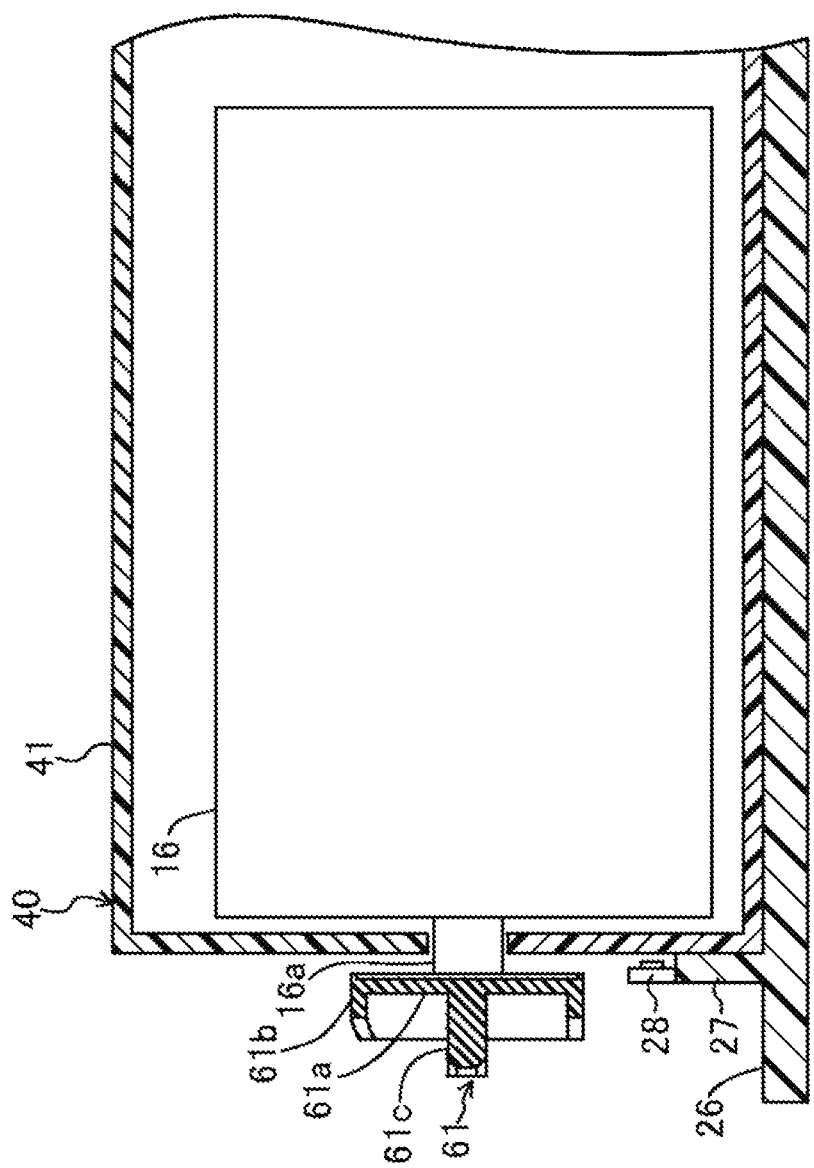
FIG. 2 is a schematic diagram showing an attachment structure of an output-side joint member to a photosensitive drum.
Figure 3:
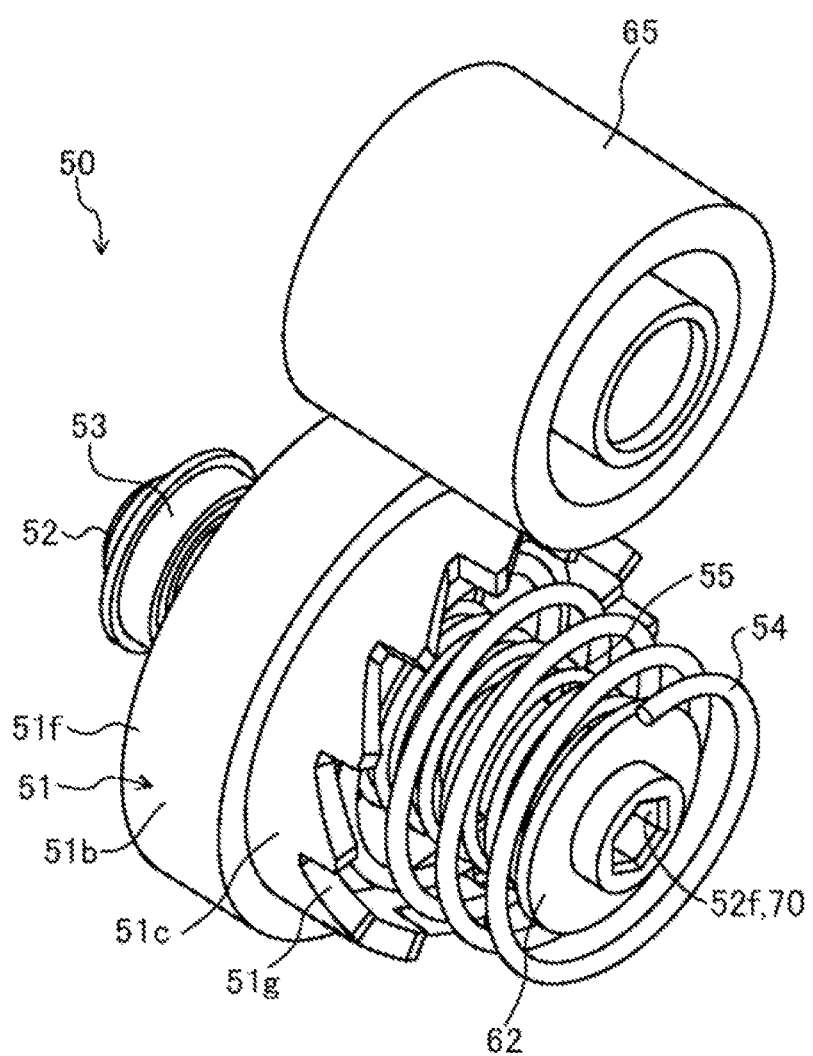
FIG. 3 is a perspective view showing a drum driving device.
Figure 4:
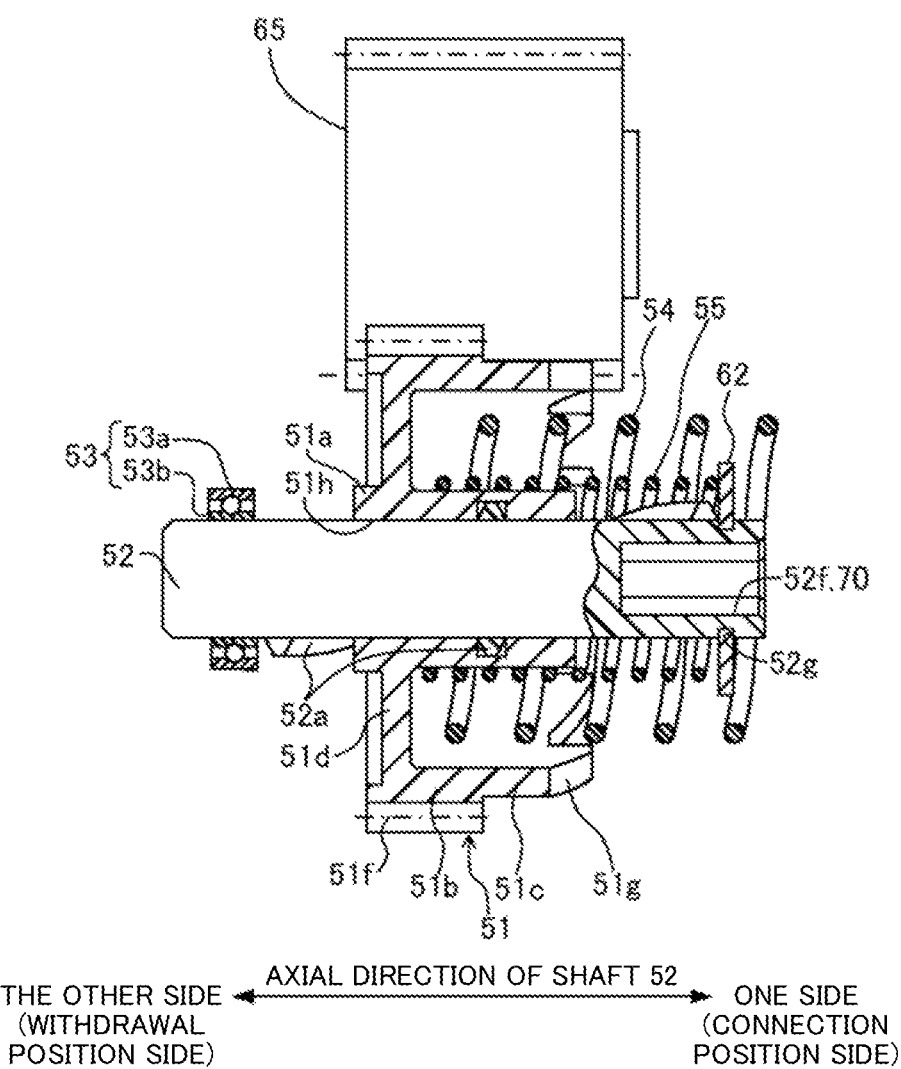
FIG. 4 is a cross-sectional view of FIG. 3 taken along the axis of the shaft.

As shown in FIG. 3 and FIG. 4, the drum driving device 50 includes a motor 59 (only shown in FIG. 6), an input-side joint member 51, a shaft 52, a bearing 53, a first compression spring 54, and a second compression spring 55. The input-side joint member 51 is driven to rotate by the power from the motor 59. The shaft 52 supports the input-side joint member 51. The bearing 53 rotatably supports the shaft 52. The drum driving device 50 is configured to drive the photosensitive drum 16 to rotate by connecting the input-side joint member 51 to the output-side joint member 61 (see FIG. 2 and FIG. 5) fixed to the photosensitive drum 16.

On the outer peripheral surface of the shaft 52, a screw portion 52a is formed over the entirety of the shaft 52, excluding both end portions (an end portion on one side and an end portion on the other side) in the axial direction of the shaft 52. As described later in detail, the input-side joint member 51 is engaged by thread with the screw portion 52a so as to be rotatably supported.

The bearing 53 is configured by a ball bearing having an outer ring 53a and an inner ring 53b. The outer ring 53a of the bearing 53 is fixed to the housing of the laser printer 1 by a bearing holding member not shown. The end portion on the other side in the axial direction of the shaft 52 is pressed into the inner ring 53b of the bearing 53 to be fixed. Thus, the shaft 52 is restrained so as not to be movable in the axial direction by the bearing 53.

In the end portion on the one side in the axial direction of the shaft 52, a connection portion 70 is formed. To the connection portion 70, the output-side joint member 61 is detachably connected. The connection portion 70 is formed by a hole portion 52f having a hexagonal prism shape and extending from the end face on the one side in the axial direction of the shaft 52 toward the other side in the axial direction thereof.

Figure 5:
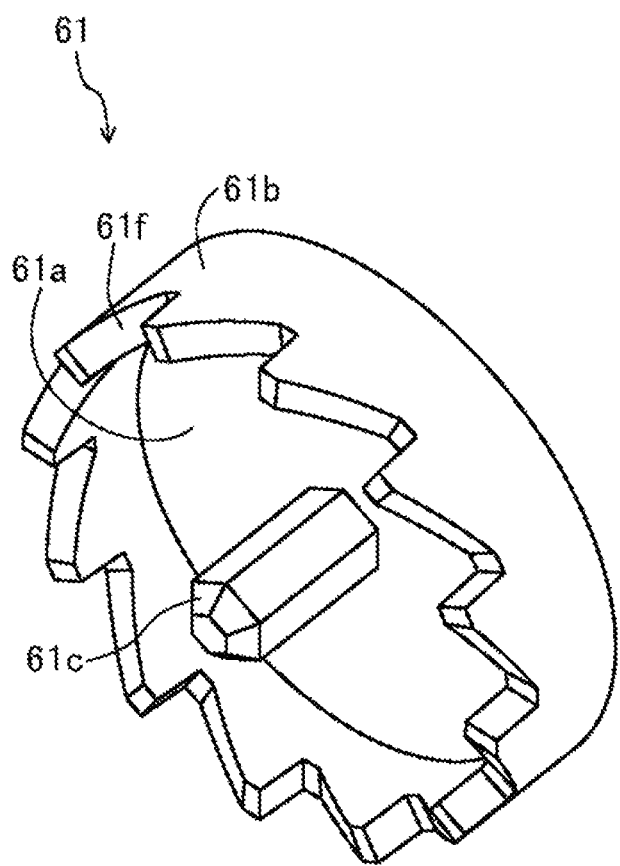
FIG. 5 is a perspective view showing the output-side joint member.

As shown in FIG. 5, the output-side joint member 61 includes a drive plate portion 61a, a ratchet cylinder portion 61b, and a protrusion 61c.

The drive plate portion 61a is formed in a circular plate shape, and is connected to the drive shaft 16a of the photosensitive drum 16 in an integrally-rotatable manner. The drive shaft 16a passes through a wall portion forming the housing 41 of the drum unit 40 to protrude outside the housing 41 (see FIG. 2). The drive plate portion 61a is fixed to an end portion on the protruding side of the drive shaft 16a. At the center portion on the surface, on the side opposite to the drum, of the drive plate portion 61a, the protrusion 61c is provided in a standing manner. The protrusion 61c is formed in a hexagonal prism shape that fits in the hole portion 52f of the shaft 52. In the periphery of the drive plate portion 61a, the ratchet cylinder portion 61b having a cylindrical shape extending toward the side opposite to the drum is formed. In an end portion, on the side opposite to the drum, of the ratchet cylinder portion 61b, sawtoothed ratchet teeth 61f are formed over the entire circumference. The drive plate portion 61a, the ratchet cylinder portion 61b, and the protrusion 61c are formed coaxially with the drive shaft 16a of the photosensitive drum 16.

As shown in FIG. 3 and FIG. 4, the input-side joint member 51 includes a nut portion 51a, a drive cylinder portion 51b, a ratchet cylinder portion 51c, and a connection plate portion 51d.

The nut portion 51a is engaged by thread with the screw portion 52a of the shaft 52 so as to be rotatably supported. On the inner peripheral surface of the nut portion 51a, a screw portion 51h to be engaged by thread with the screw portion 52a is formed.

The drive cylinder portion 51b is formed in a cylindrical shape so as to surround the outer periphery of the nut portion 51a. The drive cylinder portion 51b is formed coaxially with the nut portion 51a. On the outer peripheral surface of the drive cylinder portion 51b, a gear portion 51f is formed over the entire circumference thereof. The gear portion 51f is a spur gear portion in which each gear tooth line extends parallel to the axial direction of the drive cylinder portion 51b. The gear portion 51f is meshed with a drive gear 65 arranged radially outside the drive cylinder portion 51b. The drive gear 65 is connected to the motor 59 such that power transmission is allowed. The drive force from the motor 59 is transmitted via the drive gear 65 to the gear portion 51f, whereby the drive cylinder portion 51b is rotated.

The ratchet cylinder portion 51c has a cylindrical shape protruding from the end face on the one side in the axial direction of the drive cylinder portion 51b. The ratchet cylinder portion 51c is formed coaxially with the drive cylinder portion 51b. In an end portion on the one side in the axial direction of the ratchet cylinder portion 51c, sawtoothed ratchet teeth 51g are formed over the entire circumference.

The connection plate portion 51d is formed in an annular shape. The inner periphery of the connection plate portion 51d is connected to an end portion on the other side in the axial direction of the outer peripheral surface of the nut portion 51a. The outer periphery of the connection plate portion 51d is connected to an end portion on the other side in the axial direction of the inner peripheral surface of the drive cylinder portion 51b.

In a state where rotation of the shaft 52 is restricted, when the drive cylinder portion 51b is rotated in the forward direction (rotated in the counterclockwise direction when viewed from the right side in FIG. 4) by the drive gear 65, the nut portion 51a is rotated in the same direction about the screw portion 52a of the shaft 52. Accordingly, the input-side joint member 51 moves toward from the other side toward the one side in the axial direction of the shaft 52. On the other hand, when the drive cylinder portion 51b is rotated in the reverse direction (rotated in the clockwise direction when viewed from the right side in FIG. 4) by the drive gear 65, the nut portion 51a is rotated in the same direction about the screw portion 52a of the shaft 52. Accordingly, the input-side joint member 51 moves from the one side toward the other side in the axial direction of the shaft 52.

Figure 7:
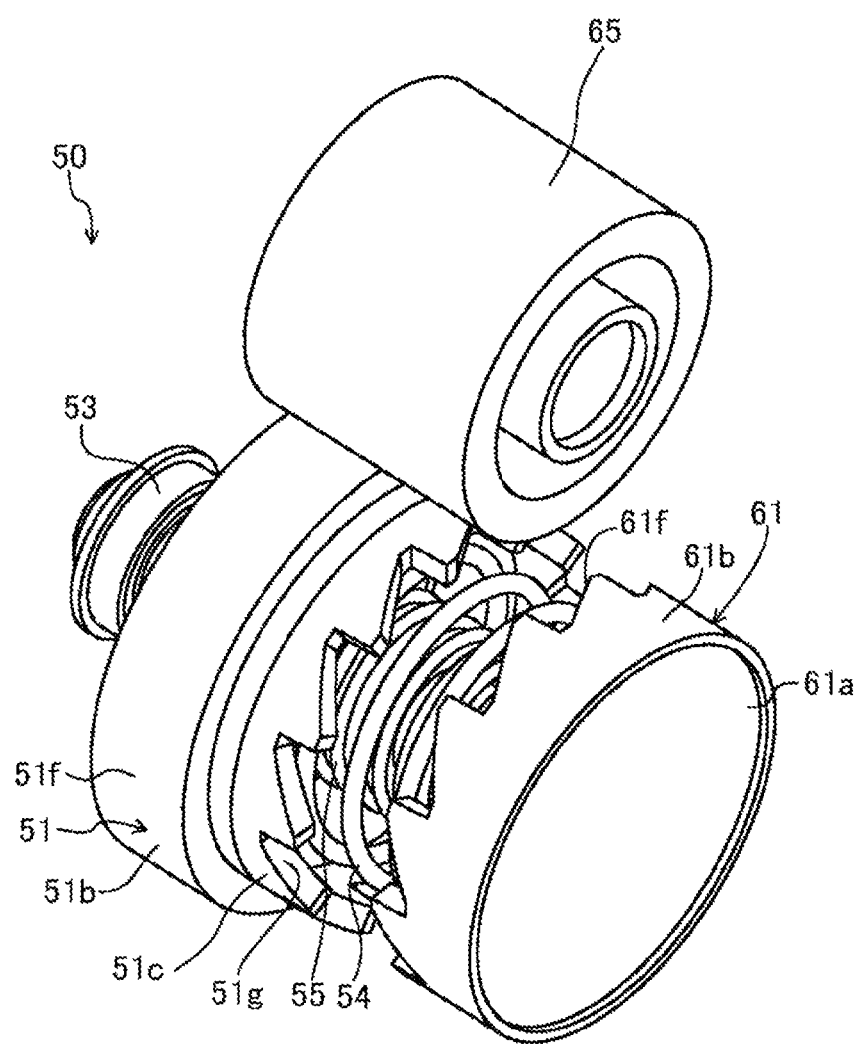
FIG. 7 is a perspective view showing the drum driving device in a state where connection between an input-side joint member and the output-side joint member is cut off.
Figure 8:
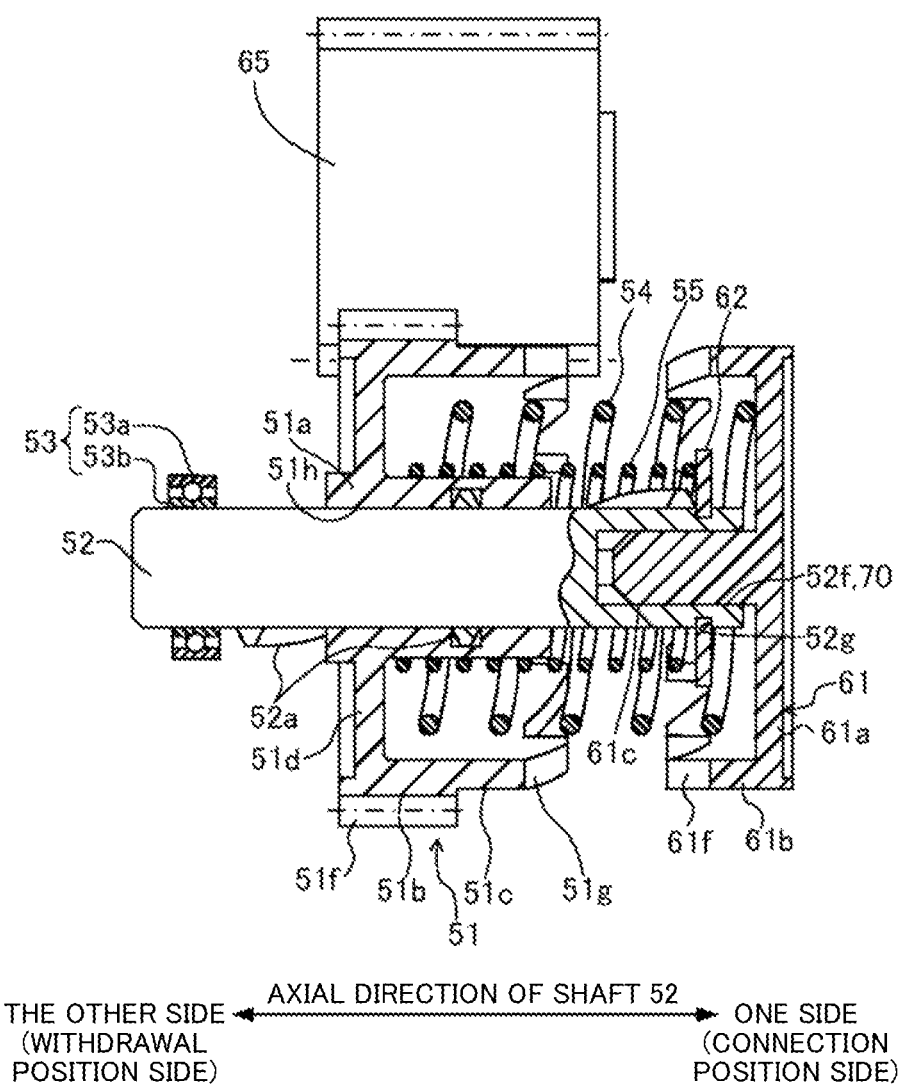
FIG. 8 is a cross-sectional view of FIG. 7 taken along the axis of the shaft.
Figure 9:
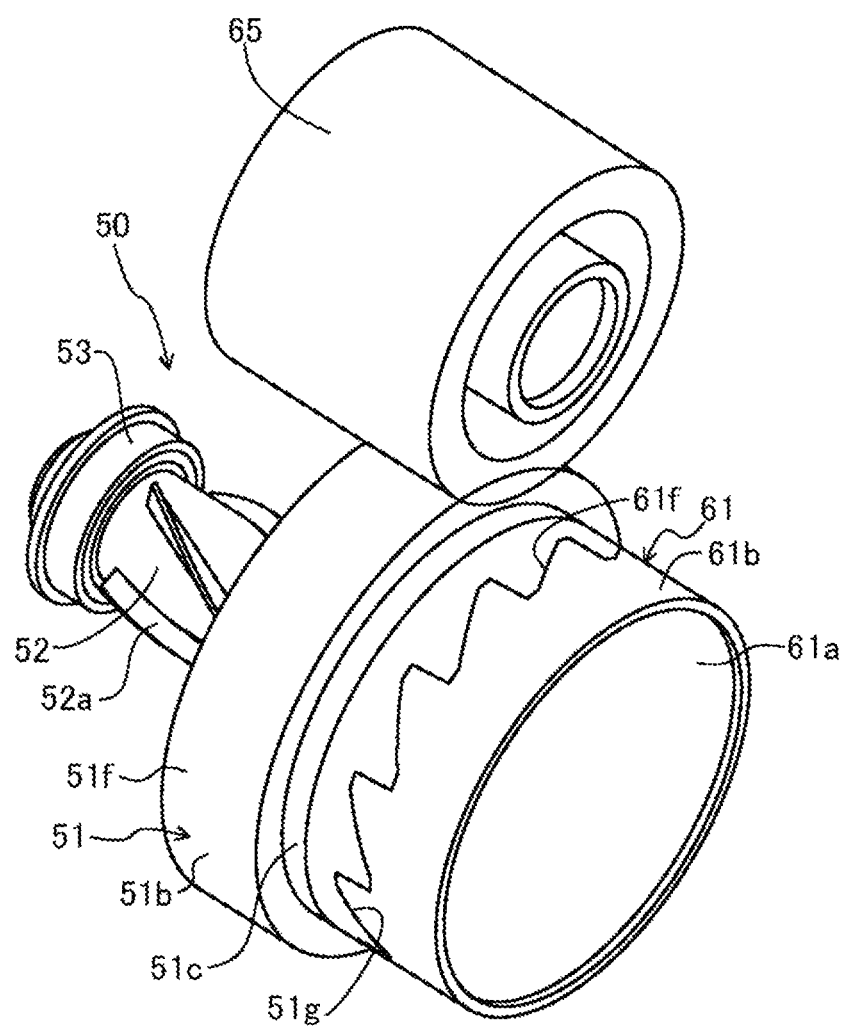
FIG. 9 is a perspective view showing the drum driving device in a state where the input-side joint member and the output-side joint member are connected to each other.
Figure 10:
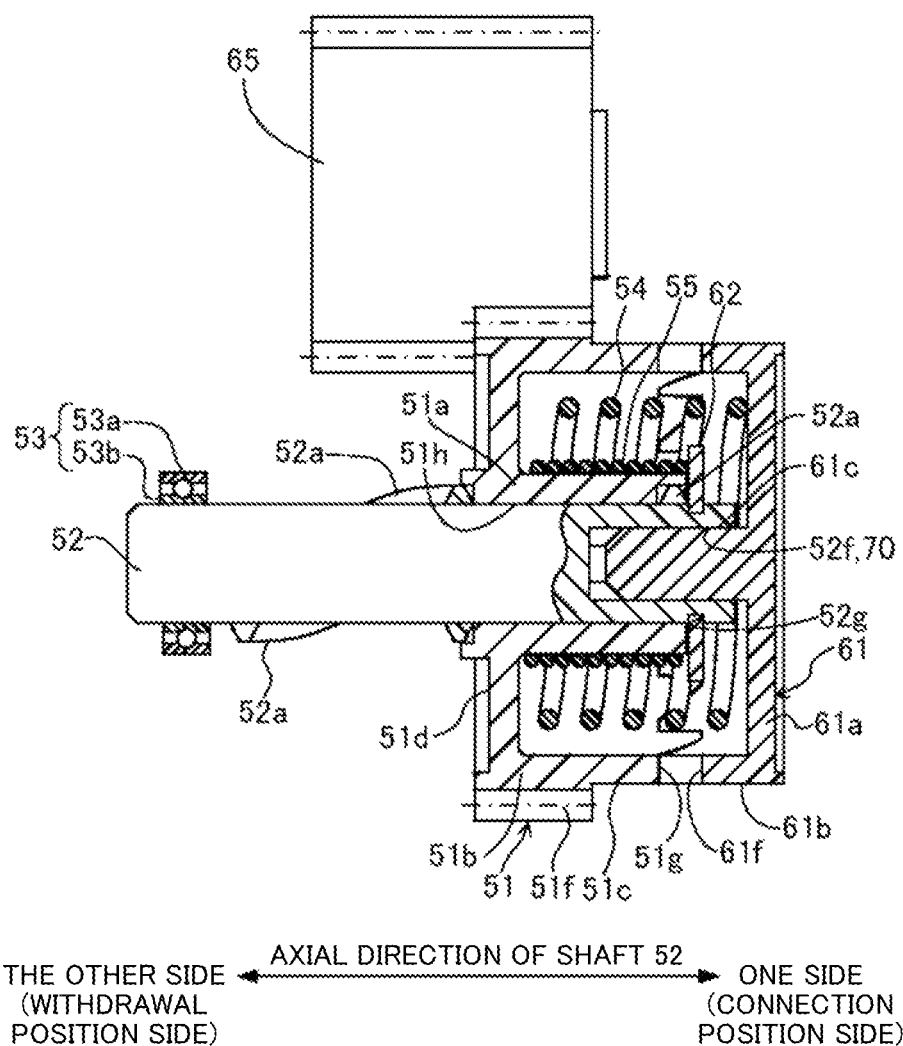
FIG. 10 is a cross-sectional view of FIG. 9 taken along the axis of the shaft.

Thus, the input-side joint member 51 is configured to be movable between a connection position (the state in FIG. 9 and FIG. 10) and a withdrawal position (the state in FIG. 7 and FIG. 8). The connection position is a position where the input-side joint member 51 is connected to the output-side joint member 61. The withdrawal position is a position where connection of the input-side joint member 51 is cut off.

To the surface on the one side of the connection plate portion 51d of the input-side joint member 51, the first compression spring 54 is attached. The first compression spring 54 is arranged substantially coaxially with the shaft 52 and is capable of expanding and contracting in the axial direction of the shaft 52. One end portion of the first compression spring 54 is a free end, whereas the other end portion of the first compression spring 54 is fixed to the connection plate portion 51d of the input-side joint member 51.

To the outer peripheral surface of the nut portion 51a of the input-side joint member 51, the second compression spring 55 is externally fitted. The second compression spring 55 is arranged substantially coaxially with the shaft 52 and is capable of expanding and contracting in the axial direction of the shaft 52. The second compression spring 55 is arranged, sandwiched by a washer 62 having a C shape and attached to the shaft 52, and the connection plate portion 51d of the input-side joint member 51. In the end portion on the one side in the axial direction of the shaft 52, a ring groove 52g is formed, and the washer 62 is fitted in the ring groove 52g. Thus, the second compression spring 55 is connected to the shaft 52 via the washer 62. Accordingly, the second compression spring 55 urges the input-side joint member 51 from the connection position side toward the withdrawal position side.

Figure 6:
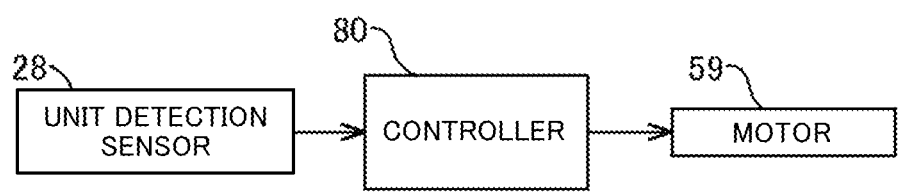
FIG. 6 is a block diagram showing a configuration of a control system of the drum driving device.

The drive of the motor 59 is controlled by the controller 80 (see FIG. 6). When the controller 80 determines, based on a detection signal from the unit detection sensor 28, that the drum unit 40 is mounted to the unit mounting portion, the controller 80 rotates the motor 59 in the forward direction, thereby rotating the input-side joint member 51 in the forward direction. On the other hand, when the controller 80 determines that the drum unit 40 is not mounted to the unit mounting portion, the controller 80 cuts off excitation of the motor 59 to set the motor 59 in a rotatable state.

Next, operation of the drum driving device 50 will be described. First, a case where the drum unit 40 is not mounted to the unit mounting portion will be described. In this case, as shown in FIG. 3 and FIG. 4, the input-side joint member 51 of the drum driving device 50 is located at the withdrawal position. In this state, when the input-side joint member 51 is rotated in the forward direction by the motor 59, the input-side joint member 51 is to move toward the drum unit 40 side (the one side in the axial direction of the shaft 52) while rotating about the screw portion 52a of the shaft 52. However, since the input-side joint member 51 is pushed back toward the side opposite to the unit by the second compression spring 55, and thus, the input-side joint member 51 rotates along with the shaft 52 while maintaining its position in the axial direction.

As shown in FIG. 7 and FIG. 8, when the drum unit 40 is mounted to the unit mounting portion, the protrusion 61c of the output-side joint member 61 is inserted into the hole portion 52f of the shaft 52, and the output-side joint member 61 is connected to the shaft 52 in an integrally-rotatable manner. As a result, the shaft 52 is connected to the photosensitive drum 16 via the output-side joint member 61, and thus, static friction of rotation of the shaft 52 immediately increases. Therefore, even when rotational driving force is applied from the motor 59 to the input-side joint member 51, the shaft 52 does not rotate. However, under the rotational driving force applied from the motor 59, the input-side joint member 51 moves toward the drum unit 40 side (the one side in the axial direction of the shaft 52) against urging forces of the first and second compression springs 54 and 55, to be connected via the ratchet teeth 51g and 61f to the output-side joint member 61 (see FIG. 9 and FIG. 10). The position of the input-side joint member 51 at this time corresponds to the connection position. When the input-side joint member 51 has been moved to the connection position, rotational driving force of the input-side joint member 51 is transmitted to the photosensitive drum 16 via the output-side joint member 61. As a result, the input-side joint member 51, the output-side joint member 61, and the shaft 52 integrally rotate.

When the drum unit 40 is to be dismounted from the unit mounting portion, the motor 59 is stopped, and then, the drum unit 40 is pulled out toward the front side of the printer 1 along the support base 26 (see FIG. 2). Accordingly, the protrusion 61c of the output-side joint member 61 is disengaged (comes off) from the hole portion 52f of the input-side joint member 51. As a result, the first compression spring 54 is released, and thus, the output-side joint member 61 is pushed out to the front side of the printer 1 by the urging force of the first compression spring 54. Accordingly, compared with a case where the first compression spring 54 is not provided, dismounting work of the drum unit 40 (the photosensitive drum 16) can be facilitated. As a result, physical burden on an operator at the time of dismounting is reduced.

When dismounting of the drum unit 40 is completed, the input-side joint member 51 automatically moves from the connection position on the drum unit side to the side opposite to the unit by the urging force of the second compression spring 55, to be returned to the withdrawal position. In detail, in a state where the input-side joint member 51 is connected to the output-side joint member 61 at the connection position, when the drum unit 40 is dismounted from the drum driving device 50, the protrusion 61c of the output-side joint member 61 is disengaged (comes off) from the hole portion 52f of the input-side joint member 51. Accordingly, there exists nothing that restrains rotation of the input-side joint member 51. In a state where the output-side joint member 61 is disengaged in this manner, the input-side joint member 51 becomes able to rotate about the screw portion 52a of the shaft 52. As a result, the input-side joint member 51 moves from the connection position side to the withdrawal position side while rotating about the screw portion 52a of the shaft 52 under the urging force of the second compression spring 55. That is, simply by the drum unit 40 being dismounted, the input-side joint member 51 automatically withdraws to the withdrawal position under the urging force of the second compression spring 55. It should be noted that at the withdrawal position, the length of the second compression spring 55 matches the natural length thereof.

Therefore, when the drum unit 40 is to be mounted to the unit mounting portion next time, a sufficient distance between the input-side joint member 51 and the output-side joint member 61 can be secured. Thus, without compressively deforming the first compression spring 54 between the input-side joint member 51 and the output-side joint member 61, the work of mounting the drum unit 40 can be performed. Accordingly, the work of mounting the drum unit 40 need not be performed against the urging force of the first compression spring 54, and thus, mounting of the drum unit 40 (the photosensitive drum 16) can be facilitated. That is, it is not necessary to push the output-side joint member 61 to the input-side joint member 51 against the urging force of the first compression spring 54, and thus, even when the first compression spring 54 is provided, physical burden on the operator is reduced.

Other Embodiments

In the above embodiment, the first compression spring 54 is fixed to the input-side joint member 51. However, the present invention is not limited thereto. For example, the first compression spring 54 may be fixed to the output-side joint member 61.

Further, in the above embodiment, when the controller 80 has determined that the drum unit 40 has been dismounted from the unit mounting portion based on a signal from the unit detection sensor, the controller 80 cuts off excitation of the motor 59 to set the motor 59 in a rotatable state. However, the present disclosure is not limited thereto. The rotation shaft of the motor 59 may be fixed, without cutting off excitation of the motor 59.

In the above embodiment, the photosensitive drum 16 being a driven body is assembled with the charging device 17, the developing device 18, and the cleaning device 19, to form a unit. However, the present disclosure is not limited thereto. The photosensitive drum 16, and other devices 17 to 19 may be each independently mounted relative to the laser printer 1.

In the above embodiment, as one example of a driven body to be driven by the drum driving device 50, the photosensitive drum 16 has been described. However, the present disclosure is not limited thereto. That is, the driven body may be, for example, a toner conveyance screw provided in the toner hopper 21.

In the above embodiment, the input-side joint member 51 is pressed by the urging spring (the second compression spring 55) from the one side to the other side in the axial direction of the shaft 52 (from the connection position side to the withdrawal position side). However, the present disclosure is not limited thereto. For example, the input-side joint member 51 may be pulled from the one side to the other side in the axial direction of the shaft 52 by a tension spring.

Moreover, in the above embodiment, the drum driving device 50 includes the second compression spring 55. However, the second compression spring 55 is not necessarily required. When the second compression spring 55 is not provided, it is sufficient that the motor 59 causes the input-side joint member 51 to withdraw to the withdrawal position.

As described above, the present disclosure is useful for a driving device including a drive source, and an input-side joint member to be driven to rotate by the drive source, the driving device configured to drive a driven body to rotate by connecting the input-side joint member to an output-side joint member fixed to the driven body. Especially, the present disclosure is useful when applied to an image forming apparatus such as a laser printer or an ink-jet printer.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A driving device including a drive source, and an input-side joint member to be driven to rotate by the drive source, the driving device configured to drive a driven body to rotate by connecting the input-side joint member to an output-side joint member fixed to the driven body, the driving device comprising:
    a shaft having a screw portion formed on an outer peripheral surface thereof;
    a support member configured to rotatably support the shaft;
    a restraining member configured to restrain the shaft so as not to be movable in an axial direction thereof; and
    a connection portion formed in one end portion of the shaft, including a hole portion extending from an end face of the one end portion at one end of the shaft toward the other end of the shaft in the axial direction, and having the output-side joint member detachably connected thereto, wherein
    the output-side joint member includes a protrusion configured to be inserted in and fit in the hole portion so as to connect the output-side joint member to the shaft in an integrally-rotatable manner,
    the input-side joint member is engaged by thread with the screw portion of the shaft so as to be rotatably supported, and is configured to, by being driven to rotate by the drive source, be able to move between a connection position where the input-side joint member is connected to the output-side joint member and a withdrawal position where the connection is cut off, and
    the driving device further comprises a compression spring configured to, when the input-side joint member is moved from the withdrawal position to the connection position by the drive source, compressively deform in the axial direction between the input-side joint member and the output-side joint member.

2. The driving device according to claim 1, further comprising:
    an urging spring connected to the shaft and configured to urge the input-side joint member from the connection position toward the withdrawal position.

3. The driving device according to claim 2, wherein
    the urging spring is configured to, when the output-side joint member is disengaged from the connection portion of the shaft, locate the input-side joint member at the withdrawal position by an urging force from the connection position toward the withdrawal position.

4. The driving device according to claim 1, wherein,
    the hole portion and the protrusion are each formed to have a hexagonal prism shape.

5. The driving device according to claim 1, wherein,
    the driven body is a photosensitive drum included in a drum unit that is mounted to a mounting portion provided in an image forming apparatus such that the drum unit can be inserted into and detached from the mounting portion in a front-rear direction of the image forming apparatus, and
    the output-side joint member is fixed to one end portion of a rotation shaft of the photosensitive drum.

6. The driving device according to claim 1, wherein,
    ratchet teeth are respectively formed on the input-side joint member and the output-side joint member so as to mesh with each other to connect the input-side joint member and the output-side joint member when the input-side joint member is in the connection position.

* * * * *